US008463892B2

(12) United States Patent
Troyansky et al.

(10) Patent No.: US 8,463,892 B2
(45) Date of Patent: Jun. 11, 2013

(54) METHOD AND SYSTEM FOR INFORMATION LEAK PREVENTION

(75) Inventors: Lidror Troyansky, Givataim (IL); Assaf Litai, Kfar-Saba (IL); Sharon Bruckner, Tel-Aviv (IL)

(73) Assignee: PortAuthority Technologies Inc., San Diego, CA (US)

( * ) Notice: Subject to any disclaimer, the term of this patent is extended or adjusted under 35 U.S.C. 154(b) by 1617 days.

(21) Appl. No.: 11/485,537

(22) Filed: Jul. 13, 2006

(65) Prior Publication Data

US 2007/0028297 A1    Feb. 1, 2007

Related U.S. Application Data

(60) Provisional application No. 60/698,970, filed on Jul. 14, 2005.

(51) Int. Cl.
*G06F 15/173* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 2002/0129140 | A1 | 9/2002 | Peled et al. | |
| 2004/0058705 | A1* | 3/2004 | Morgan et al. | 455/556.1 |
| 2005/0210116 | A1* | 9/2005 | Samson | 709/207 |
| 2006/0149821 | A1* | 7/2006 | Rajan et al. | 709/206 |

OTHER PUBLICATIONS

Zadeh "Fuzzy Sets as a Basis for a Theory of Possibility", Fuzzy Sets and Systems 1: 3-28, 1978.
Fuglede et al. "Jensen-Shannon Divergence and Hilbert Space Embedding", IEEE International Symposium on Information Theory 2004.
Kullback et al. "On Information and Sufficiency", Annals of Mathematical Statistics, 22(1): 79-86, Mar. 1951.
Neyman et al. "On the Problem of the most Efficient Tests of Statistical Hypotheses", Philosophical Transaction of the Royal Society A, 231: 289-337, 1933.

* cited by examiner

*Primary Examiner* — Ryan Jakovac

(57) ABSTRACT

A method for mitigating false positive type errors while applying an information leak prevention policy, the method comprising the computer implemented steps of: defining at least one positive criterion for a positive set, wherein the positive criterion comprises at least one indicator of a possible breach of the information leak prevention policy; defining at least one negative criterion for a negative set, wherein the negative criterion comprises at least one indicator of benign traffic; establishing an ambiguity set in association with an intersection between the positive set and the negative set, such that information items in the intersection enter the ambiguity set; defining at least one ambiguity resolution criterion for resolving the ambiguity; monitoring and analyzing electronic traffic, where each information item in the traffic is searched for matches with the positive set; checking for membership of each item in the positive set in the ambiguity set; resolving ambiguities using one of the ambiguity resolution criterion for each member of the ambiguity set and removing items from the positive set accordingly, and applying information leak prevention policy for all items remaining in the positive set following the removal of items using ones of the ambiguity resolution criteria.

11 Claims, 6 Drawing Sheets

METHOD AND SYSTEM FOR INFORMATION LEAK PREVENTION

CROSS-REFERENCE TO RELATED APPLICATIONS

The present application claims priority from U.S. Provisional Application No. 60/698,970 filed Jul. 14, 2005, the contents of which are hereby incorporated herein by reference in their entirety.

FIELD OF THE INVENTION

The present invention relates generally to the field of information leak prevention, and more specifically but not exclusively, to mitigation of false positive indications of unauthorized dissemination of information in a digital traffic filtering system.

BACKGROUND OF THE INVENTION

The information and knowledge created and accumulated by organizations and businesses are their most valuable assets. As such, managing and keeping the information and the knowledge inside the organization and restricting its distribution outside are of paramount importance for almost any organization, government entity or business, and provide a significant leverage of its value. Most of the information in modern organizations and businesses is represented in a digital format. Digital content can be easily copied and distributed (e.g., via e-mail, instant messaging, peer-to-peer networks, FTP and web-sites), which greatly increases hazards such as business espionage and data leakage. In addition, the distribution of digital items requires resources, such as costly bandwidth and precious employee time. Unauthorized dissemination of information therefore poses a severe risk from both business and legal perspectives. However, events of unauthorized dissemination of information, especially via e-mail, are prevalent and happen in large organizations almost on a daily basis.

Another aspect of the problem is related to compliance with regulations pertaining to private and sensitive information: Regulations within the United States of America, such as the Health Insurance Portability and Accountability Act (HIPAA), the Gramm-Leach-Bliley act (GLBA) and the privacy-protecting laws of various states and nations imply that the information assets within organizations should be monitored and subjected to an information protection policy, in order to protect clients privacy and to mitigate the risks of potential misuse and fraud.

A popular method for preventing information leakage is to inspect and monitor the digital traffic, e.g., using the method described in U.S. Patent Application Publication No. 2002/0129140, filed Dec. 6, 2001, the contents of which are hereby incorporated herein by reference in their entirety, and to use information filters, such as regular expressions, in order to identify patterns of private information, such as social security numbers. However, filtering methods and techniques comprise an inherent problem of false alarms and miss-detections, respectively known as false positive and false negative errors. In order to make such methods effective, it is imperative to provide an efficient method for false positive mitigation.

There is thus a recognized need for, and it would be highly advantageous to have, a method and system that allow for mitigation of false indications of unauthorized dissemination of private, confidential or sensitive information in a digital traffic filtering system, which will overcome the drawbacks of current methods as described above.

SUMMARY OF THE INVENTION

The present invention seeks to provide a method for efficient and cost-effective mitigation of false-positives indication in digital traffic. Specifically, the current invention provides method for handling false positives that occurs in a system for monitoring and enforcing policy with respect to unauthorized dissemination of private, confidential and sensitive information.

According to one aspect of the present invention there is provided a method for mitigating false positive type errors while applying an information leak prevention policy, the method comprising the computer implemented steps of:
 a) defining at least one positive criterion for a positive set, wherein the positive criterion comprises at least one indicator of a possible breach of the information leak prevention policy;
 b) defining at least one negative criterion for a negative set, wherein the negative criterion comprises at least one indicator of benign traffic;
 c) establishing an ambiguity set in association with an intersection between the positive set and the negative set, such that information items in the intersection enter the ambiguity set;
 d) defining at least one ambiguity resolution criterion for resolving the ambiguity;
 e) monitoring and analyzing electronic traffic, where each information item in the traffic is searched for matches with the positive set;
 f) checking for membership of each item in the positive set in the ambiguity set;
 g) resolving ambiguities using one of the ambiguity resolution criterion for each member of the ambiguity set and removing items from the positive set accordingly
 h) applying information leak prevention policy for all items remaining in the positive set following the removal of items using ones of the ambiguity resolution criteria.

Preferably the criterion for the positive set comprises Luhn validation.

Additionally or alternatively, the criterion for the positive set comprises a checksum validation.

Additionally or alternatively, the criterion for the positive set comprises checking for a membership in a pre-defined list.

Additionally or alternatively, a criterion for the positive set comprises a match with a regular expression.

Additionally or alternatively, the criterion for the positive set comprises a similarity to at least one document.

Additionally or alternatively, the resolving the ambiguity comprises searching for terms related to the positive set in proximity to the matches to the positive set.

Additionally or alternatively, the resolving the ambiguity comprises searching for terms related to the negative set in proximity to the matches to the positive set.

Preferably, the resolving the ambiguity comprises applying an additional validation criterion.

Preferably, the information leak prevention policy comprises applying at least one of the following actions:
 block the message;
 quarantine the message;
 encrypt the message;
 archive the message;
 notify an authorized person about the message, and
 log the message.

According to a second aspect of the present invention, there is provided a method for mitigating false positive type errors while applying information leak prevention policy, the method comprising the computer-implemented steps of:

i) monitoring and analyzing electronic traffic, where each item is validated using a validation filter, the validation filter being configured to assert with a predetermined level of certainty that a non-validated finding belongs to a negative set;

j) inserting a validated item to a validated set and inserting non validated item into a non-validated set;

k) finding for each member of the validated set another item most similar to the member;

l) denoting the member of the validated set a negative if the another most similar item is a member of the non-validated set;

m) denoting the validated item a positive if the most similar item is also a member of the validated set, and n) applying information leak prevention policy for all items remains in the validated set, thereby mitigating false positive errors through the transduction of information between known and unknown samples.

Preferably, the validation filter comprises Luhn validation.

Additionally or alternatively, the validation filter comprises a checksum validation.

Additionally or alternatively, the validation filter comprises checking for a membership in a pre-defined list.

Additionally or alternatively, the validation filter comprises a match with a regular expression.

Preferably, the information leak prevention policy comprises applying at least one of the following actions:
block the message;
quarantine the message;
encrypt the message;
archive the message;
notify an authorized person about the message, and
log the message.

According to a third aspect of the present invention there is provided a method for mitigating false positive type errors, while applying an information leak prevention policy to messages comprising a plurality of suspected items, through statistical analysis and hypothesis testing, the method comprising the computer-implemented steps of:

o) applying a validation filter to each of the plurality of items within the messages;

p) computing a number or proportion of items expected to pass the validation inform within the message in the case in which the message is benign;

q) counting the number of valid items and comparing it with the expected number or proportion of validated items;

r) defining as a positive case the message wherein the number of validated items is significantly greater than the expected number or proportion, and s) applying information leak prevention policy for the positive cases.

In one embodiment, the positive set comprises social security numbers and wherein the negative set comprises CUISP identifiers that are numbers valid for the set of social security numbers.

Another embodiment provides:

a) assessing the potential severity of a given possible breach of the information leak prevention policy, to identify certain threats as potentially severe;

b) for threats identified as potentially severe:
i) assigning a default positive label, and
ii) performing at least one test to validate the potential high severity cases as negative.

According to a fourth aspect of the present invention there is provided a method for maintaining an approximately constant rate of false positive type errors in traffic comprising events, for a given event validation filter, the method comprising:

a) computing an expected fraction of total events in the traffic to pass validation by the event validation filter in a given period;

b) monitoring and analyzing electronic traffic, where each event is validated using the event validation filter;

c) denoting any period wherein a fraction of validated events is significantly greater than the expected fraction, and d) performing an additional analysis of events validated in the denoted periods.

Preferably, the thorough analysis comprises a manual analysis.

Preferably, the plurality of items comprises sufficient items to have statistical significance.

According to a fifth aspect of the present invention there is provided apparatus for mitigating false positive type errors while applying an information leak prevention policy, the apparatus comprising:

a criterion definer for defining at least one positive criterion for a positive set, wherein the positive criterion comprises at least one indicator of a possible breach of the information leak prevention policy, and further for defining at least one negative criterion for a negative set, wherein the negative criterion comprises at least one indicator of benign traffic;

a disambiguator unit for establishing an ambiguity set in association with an intersection between the positive set and the negative set, such that information items in the intersection enter the ambiguity set, and for defining at least one ambiguity resolution criterion for resolving the ambiguity;

the apparatus being configured to monitor and analyzing electronic traffic, where each information item in the traffic is searched for matches with the positive set; to check for membership of each item in the positive set in the ambiguity set; and to resolve ambiguities using one of the ambiguity resolution criterion for each member of the ambiguity set and removing items from the positive set accordingly, thereby to allow the information leak prevention policy to be applied for all items remaining in the positive set following the removal of items using ones of the ambiguity resolution criteria.

The apparatus may be server or network based and/or may use autonomous agents.

The present invention successfully addresses the shortcomings of the presently known configurations by providing a method and system for an efficient handling of false positive indications of unauthorized dissemination of information in a digital traffic filtering system.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF PREFERRED EMBODIMENTS

Figure 1:
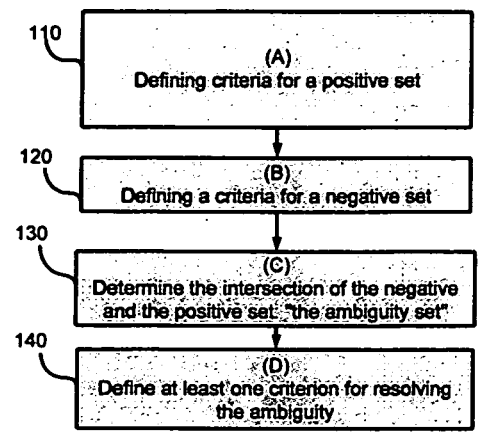
FIGS. 1a and 1b are simplified block diagrams illustrating a method an efficient handling of false positive indications of unauthorized dissemination of information in a digital traffic filtering system, constructive and operative according to a preferred embodiment of the present invention.
Figure 1:
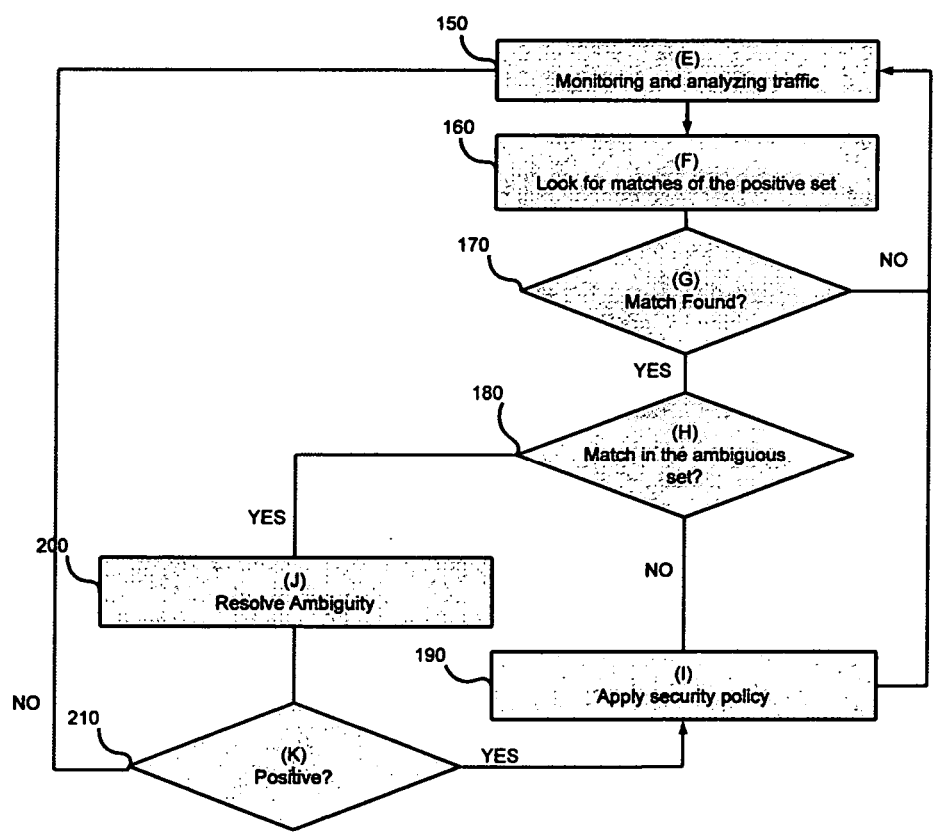

The presently preferred embodiments describe a method and system for efficient handling of false positive indications of unauthorized dissemination of information in a digital traffic filtering system.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Throughout the disclosure and the claims of the present invention we shall use the term "positive" or "positive set" to define findings that constitute private, sensitive or confidential information, and for which action may be required, and "negative" as findings of benign traffic, for which typically no action is required. "False positives" refer to findings which are mistakenly identified as "positive", and "False negatives" refer to findings which were mistakenly identifies as "negative"

According to a first aspect of the present invention a method for preventing information leaks while maintaining a low rate of false positives is described. The method analyzes information items, such as documents, spreadsheets, multimedia files etc, and determines whether they are allowed to be sent according to the relevant security or distribution policy.

For a better understanding of this method, we briefly define and describe two types of validation schemes: intrinsic validation, which tests the validity of a specific finding without considering additional information, and extrinsic validation, which looks for additional information in the environment of the specific finding to obtain a better decision or to resolve the ambiguity. Intrinsic validation of the items in the positive set can be based on arithmetic operations, e.g. a Credit Card Number's validity can be derived using the Luhn validation algorithm, hereby described: First, every second digit, starting with the second digit from the end and proceeding to the left, is multiplied by 2. If that result is greater than 9, its digits are summed. Second, all the digits are added together. Finally, the result is divided by 10. If the remainder is zero, the original number is valid. Other intrinsic validation methods can be based on checking against an explicit or implicit list of items or looking for valid ranges.

Extrinsic validation methods include looking for supporting keywords in a predetermined proximity of the match, e.g. words like "CCN" or "Credit Card Number" within 20 words before or after the match.

Another extrinsic method involves looking at the expected number of validated matches, and performing hypothesis testing in order to decide whether the hypothesis that these numbers came from a random source can be rejected with a high level of confidence (e.g., that this chance is smaller then 5%). For example, consider a list of 10 16-digit numbers: the expected number of valid numbers in case of a random source is 1. The chance of all 10 numbers being valid numbers is $0.1^{10}$, which is one to 10 billion, and we can safely reject this hypothesis.

Reference is now made to FIGS. 1*a* and 1*b*, which illustrate a method for efficient handling of false positive indications of unauthorized dissemination of information in a digital traffic filtering system, constructive and operative according to a preferred embodiment of the present invention. FIG. 1*a* describes the preliminary stages:

At stage A, 110, at least one criterion for a positive set is defined. The positive set comprises indicators of a possible breach of a security policy, distribution policy or information leak prevention policy. Such indicators may be patterns of Social Security Numbers, Credit Card Numbers, etc. However, at this stage a more permissive definition of the pattern can be employed—e.g., 9 digit numbers are positive indicators of Social Security Number. At stage B, 120, at least one criterion for a negative set is defined. The negative set comprises indicators of a benign traffic—e.g., 9 digit numbers that are CUSIP numbers (see below) which are prevalent in business communication. At stage C, 130, the intersection between the negative and the positive set, denoted as "the ambiguity set" is established—e.g, determining those CUSIP numbers which are also valid SSN numbers. At stage D, 140, we define at least one criterion for resolving this ambiguity, e.g—requiring that the information item contains at least one of the terms SSN, Social Security Number, SS#, anywhere in the document or in some predetermined proximity to the number in question.

Turning now to FIG. 1*b*, which illustrates the stages for applying the policy on information items in traffic:

At stage E, 150, the electronic traffic, such as email, FTP, instant messaging, etc, is monitored and analyzed. At stage F, 160, each information item in the traffic is searched for matches of the positive set, e.g.—an email is searched for 9 digit numbers. At Stage G, 170, if the set of positive matches is not empty, for each member of the set, go to Stage H, 180. Otherwise, return to Stage E, 150. At Stage H, 180, membership in the ambiguous set is checked. If the match is a member of the ambiguous set, go to Stage J, 200. Otherwise, go to Stage I, 190. At Stage I, 190, we apply the appropriate security policy, e.g.—block, encrypt, notify. At Stage J, 200, we resolve the ambiguity for that match using methods such as arithmetic validation, look for existence of predefined keywords in proximity, statistical analysis. At Stage K, 210, the result of the resolution is checked. If the result is positive, go to Stage I, 190. Otherwise, return to stage E, 150.

In a preferred embodiment of the present invention the positive and the negative sets are fuzzy sets, as described, e.g., in Zadeh, L. A., *Fuzzy Sets as a Basis for a Theory of Possibility, Fuzzy Sets and Systems*, Vol. 1, No. 1, pp. 3-28 (1978), the contents of which are hereby incorporated herein by reference in their entirety. In this case each element of the sets has a membership index, and the ambiguity is defined using two thresholds—for the membership in the positive set and the membership in the negative set, thereby providing additional degrees of freedom. The membership can be determined using the amount of evidence for membership: e.g., a 9 digit number has a "0" membership in the positive set and "1" membership in the negative set if it is a non-issued social security number, a "0.5" membership in both sets if it is non-delimited and identical to an issued social security number. The appearance of the term "SSN" right before the number can increase its membership in the positive set by, say, 30%, while the appearance of many other non issued 9 digit numbers in proximity may decrease its membership in the positive set, and increase its membership in the negative set accordingly. In general, as we apply more and more decisive filters we expect to see the membership index in one of the sets become significantly higher than the membership index in the other set.

Figure 2:
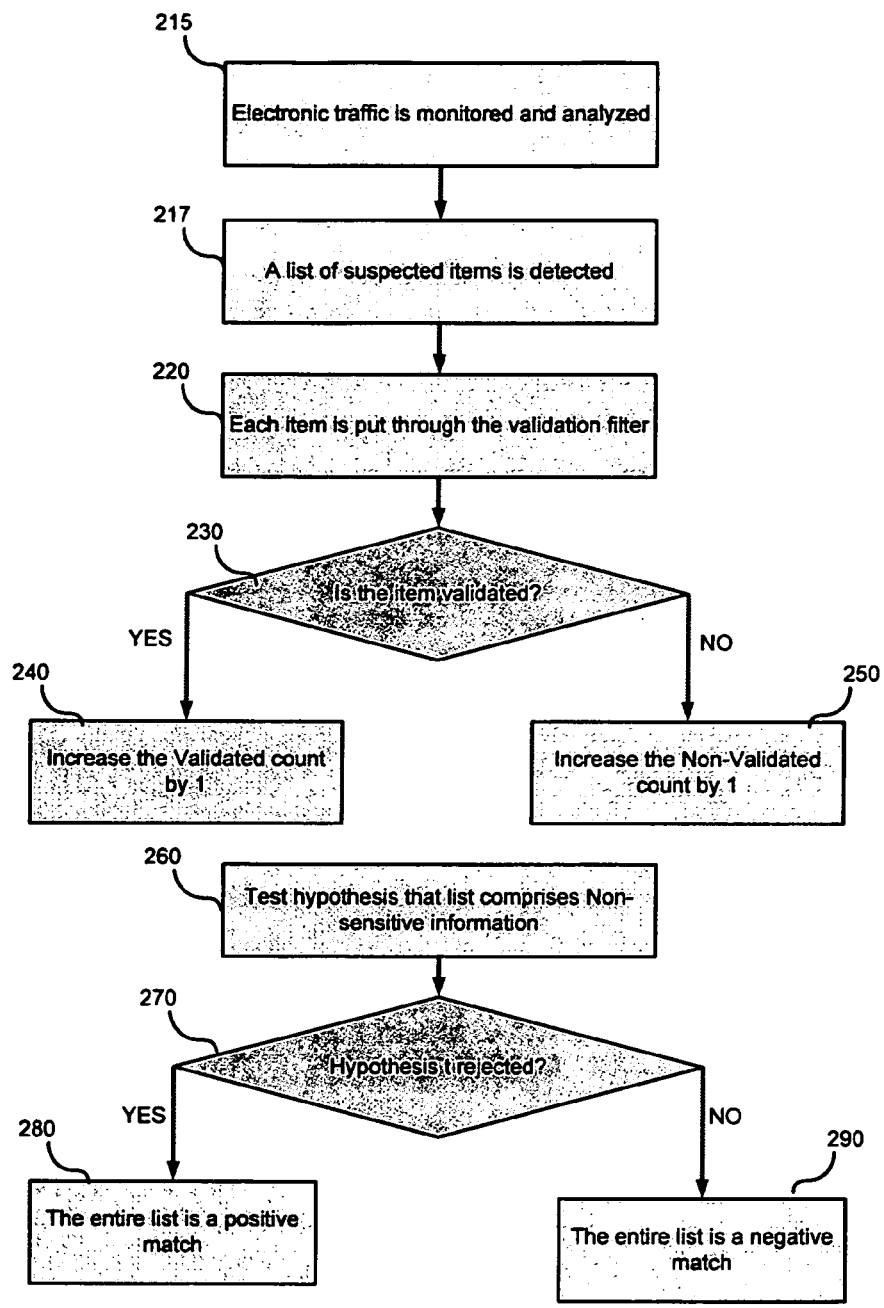
FIG. 2 is a simplified block diagram illustrating the mitigation of false positives through statistical conditioning, according to a preferred embodiment of the present invention.

Reference is now made to FIG. 2, which is a flow diagram showing where the process begins with all electronic traffic being monitored (stage 215). A list of suspected items is detected, e.g. a list of numbers which can be Credit Card Numbers or Social Security Numbers (stage 217). Each item on the list is validated using any of the filters previously described, e.g. Luhn validation or checking against SSN list (stage 220), and we ask if the item is validated (stage 230). If the item is indeed validated, the count of validated items is increased by 1 (stage 240). Otherwise, the count of non-validated items is increased by 1 (stage 250). When all the items in the list have been tested, the hypothesis that this list comprises sensitive information is tested—e.g., by comparing the number of validated numbers with the expected number for a random source, and using statistical significance tests as described, e.g., in R. Fisher "Statistical Methods for Research Workers", 13th ed. Hafner: New York; 1958, or hypothesis testing as described, e.g., in the article by Neyman and Pearson: "*On the problem of the most efficient tests of statistical hypotheses*" from the "*Philosophical Transaction of the Royal Society A,* 1933; 231:289-337", the contents of which are hereby incorporated herein by reference in their entirety.

If the hypothesis that the list represents non-sensitive information was rejected, then we denote the entire list to be a positive match (stage 280). Otherwise, we denote the list as a negative match (stage 290)

Figure 3:
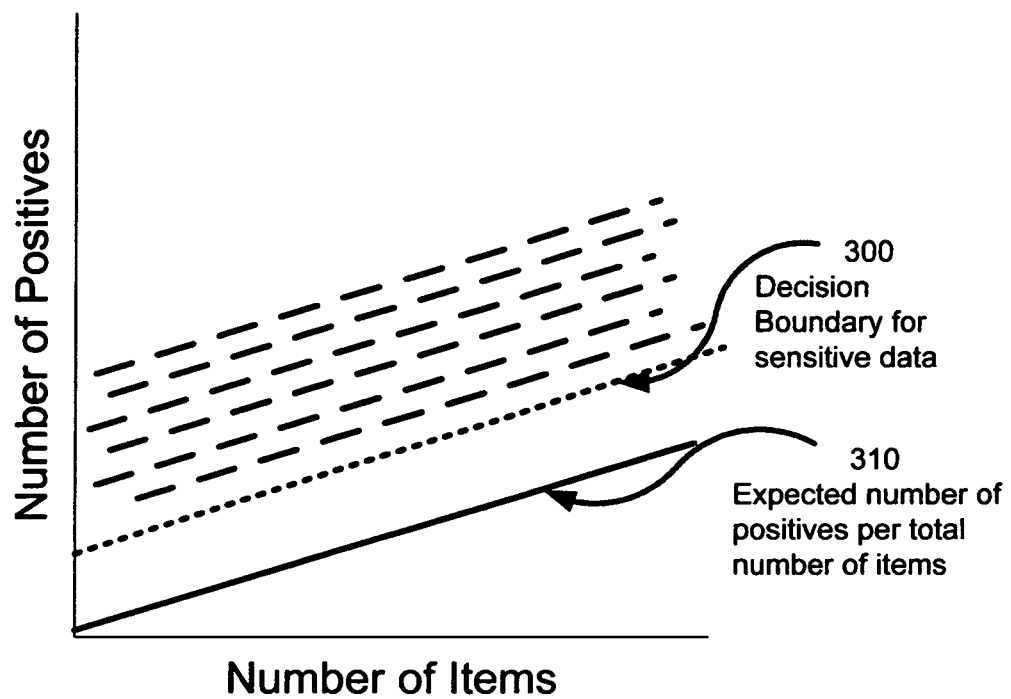
FIG. 3 is a simplified schematic diagram depicting a graph of the number of positive matches to look for as a function of the number of items, in accordance with a preferred embodiment of the present invention.

FIG. 3 is a simplified schematic diagram depicting a graph of the number of positive matches to look for as a function of the number of items, in accordance with a preferred embodiment of the present invention. The decision boundary 300 is defined in parallel to the expected number of positive matches 310, such that above the decision boundary there is a significant probability that there is a leakage of sensitive data.

In another preferred embodiment of the present invention a method for maintaining an approximately constant rate of false positives is described. The method is based on using the intrinsic validation, described above, in order to bound false positive rate. For example, the Luhn validation formula described above may yield approximately 10% positives for a random source. If we look at 1000 random 16 digit numbers, the expected number of numbers that pass the "modulo 10" validation of the formula is 100, and the distribution of the number of validated numbers is binomial with $p=0.1$ and $q=0.9$. We can now look only at periods in time where the results are significantly larger then this number: e.g., we can restrict our attention to days in which there is a significant probability of "non-innocent communication", thereby having to deal with the analysis of small fractions of the days. From information leak prevention perspective, such restriction can be justified by the insight that major leakage events are characterized by trying to leak a large number of items, such as credit-card numbers, simultaneously.

Similar consideration can also be applied to validation of other types of information: e.g. for US social security numbers, validation can be applied using the list of social security numbers issued by the social security administration (or, in a faster but less accurate manner, by ranges of prefixes).

In another preferred embodiment of the invention, the validation is used for transduction of information to unknown samples. This is based on the non-symmetric nature of the validation: while non-validated items are known for sure to comprise solely true negatives, the validated items can comprise false-positives. The transduction of the information can therefore be based on looking for similarities between the items in the negative group and the validated groups: items that have nearest neighbors in the negative group are more likely to be to be false positives than items whose closest neighbors are in the non-validated. The similarity between the items can be based on a standard textual similarity measure, such as described, e.g., in ACM Computing Surveys, Vol. 31, No. 3, September 1999, section 4, the contents of which are hereby incorporated herein by reference in their entirety.

Figure 4:
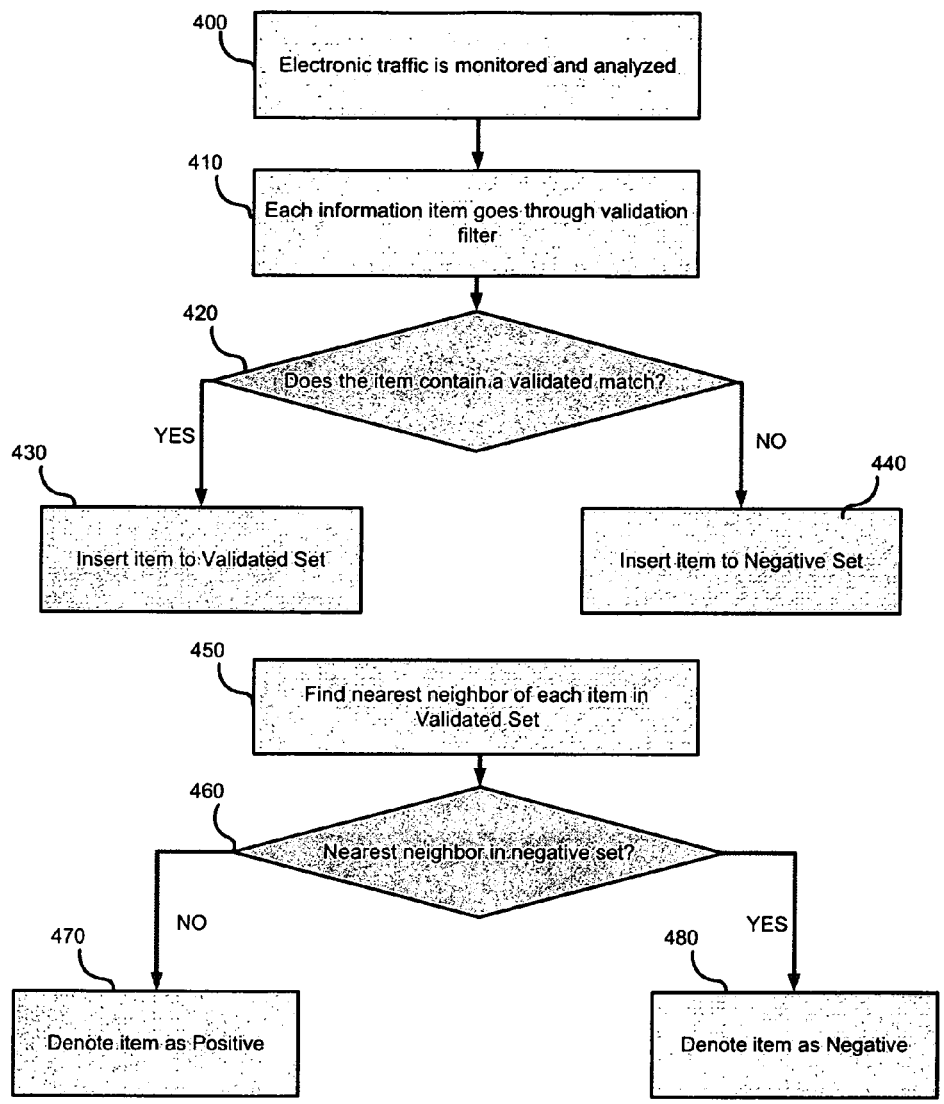
FIG. 4 is a simplified block diagram illustrating the mitigation of false positives through transduction of information from validation filters to unknown samples, according to a preferred embodiment of the present invention.

Reference is now made to FIG. 4, where the process begins with all electronic traffic being monitored (stage 400). Each of the information items goes through a validation filter, e.g. Luhn, or any other filter having the property that an information item which it does not validate is certain to be negative (stage 410). Therefore, for each information item we can ask whether it has been validated or not (stage 420). If it is not validated, we insert it into the negative set (stage 440). If it is validated, we insert it into the validated set (stage 430). The validated set thus contains both negative and positive items. When done going over all the information items, we can use the negative set to separate the valid set into true positives and negatives. To do so, for each item in the validated set we look at the distance between that item (current item) and the negative set, e.g. by looking at that item's nearest neighbor (stage 450), or k-nearest neighbors, or any weighted similarity measure. We then ask if the nearest neighbor belongs to the negative set (stage 460). If so, we denote the current item as negative, and insert it to the negative set (stage 440). Otherwise, the nearest neighbor is also validated, and we denote the item as positive (stage 470).

Figure 5:
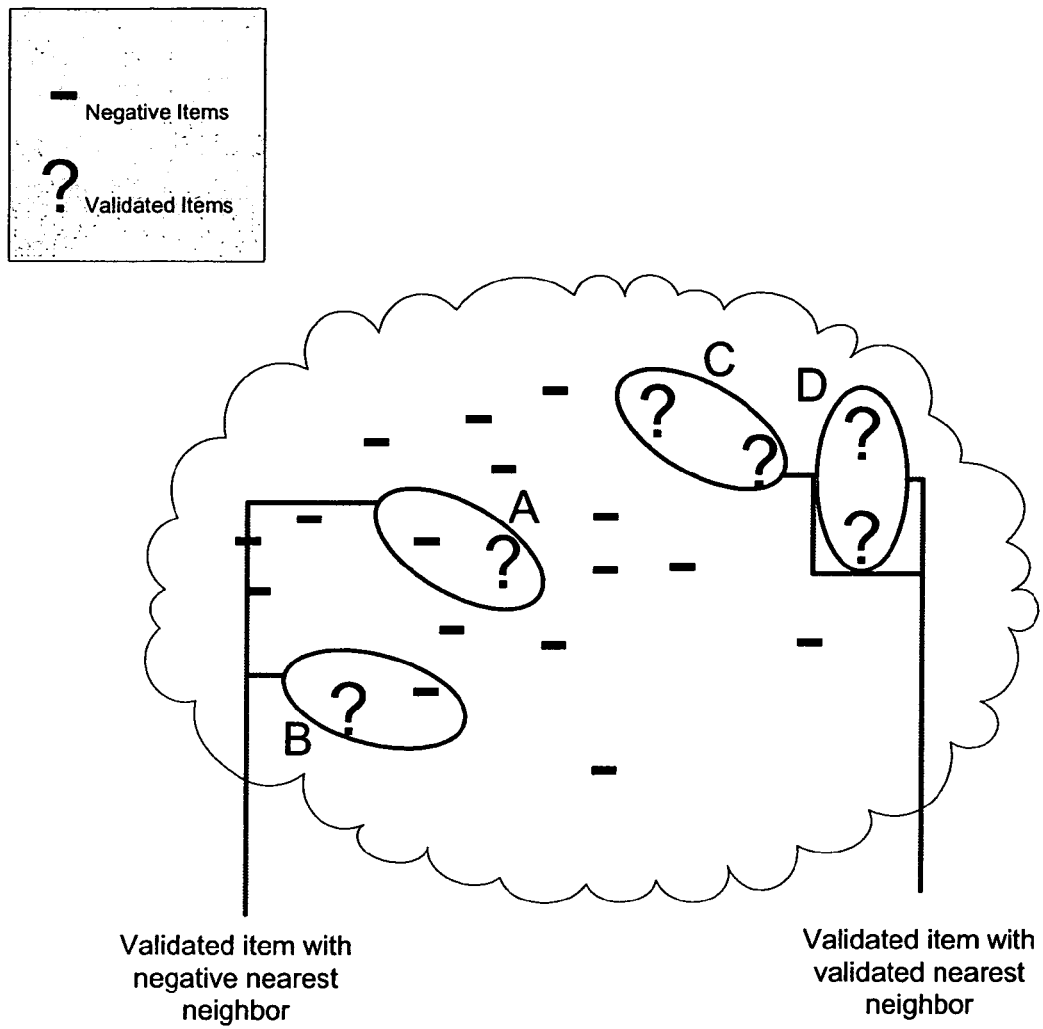
FIG. 5 is a simplified schematic diagram depicting the representation of validated and negative information items and finding their nearest neighbors, in accordance with a preferred embodiment of the present invention.

FIG. 5 is a simplified graphic representation of the results of a filter for asserting with a level of certainty that an item belongs to the negative set, but can err when it declares that an item belongs to the positive set. Each information item in the space depicted by the cloud is assigned a (-) sign if it did not pass validation, and a (?) sign if it passed validation. For each item marked with a (?), we look for its nearest neighbor, e.g. the nearest neighbor of (A) is a (-), and likewise for (B). On the other hand, the nearest neighbor of (C) is another (?), and same with (D).

From this we conclude that (A) and (B) are negative matches, while (C) and (D) are positive matches, thereby transducting or propagating the information from the negative set to the uncertain set, and reducing false positives.

In general, breaches of security policies may have different levels of severity—for example, an accidental event in which a single social security number was disseminated, without details which constitute personal information of its bearer, is much less severe then an event in which a database of Credit Card numbers along with full details of their owners is maliciously exposed.

Severity can be quantified by the amount of damage done to the organization as a result of the leak, or the possible risks thereof. In general, Severity can be expressed as a function S: E→[0,1], where E is an event composed of content and transaction parameters: the sender, the recipients and their number, the time the transaction took place, and the channel.

The likelihood measures how certain we are that the event constitutes a breach.

For an event E this can be quantified with any of the methods previously described, e.g. using support terms in proximity, and the inherent ratio of validated to non-validated items.

In a preferred embodiment of the present invention, initial risk & severity assessment of the event are automatically conducted according to, e.g.:

The information type (e.g., Excel files are more risky than MP3 files)
The amount of information
The sender and the recipients
Temporal sensitivity: there are periods when the impact of a breach is potentially much greater: e.g., before M&A (merging and acquisition), before publishing material information such as quarterly or yearly reports, etc.)

After assessing the risk, the resources to be allocated to the test can thereafter be automatically defined. Consequently, high-risk events can be analyzed more thoroughly.

In another preferred embodiment of the present invention, the statistical properties and distribution of the information is used in order to mitigate false-positives. For example, the statistics of birth-date (DOB) is not uniform across the year: for example, one can see that there are significantly more births in the months of summer (depending on geographical region). One can use this fact in order to differentiate between a list of DOB and a list of randomly generated dates. This can be done by looking at the distance between distributions using measures such as Kullback-Leibler, described in "*Annals of Mathematical Statistics,* 22(1):79-86, March 1951", the contents of which are hereby incorporated herein by reference in their entirety, Jensen-Shannon, described in Fuglede B, Topsøe F: "Jensen-Shannon Divergence and Hilbert Space Embedding", in "*IEEE International Symposium on Information Theory* 2004", the contents of which are hereby incorporated herein by reference in their entirety, the aforementioned Neyman-Pearson, or any other likelihood test. In many cases, this can be supported by using the fact that the distribution is less concentrated on recent years.

In a preferred embodiment of the present invention, the method is operative to handle false positives in a system operative to identify 9-digit numbers as possible social security numbers (SSN), and wherein the false-positives may be caused by 9-digit alphanumeric security identifiers assigned to all North American security issues by the Committee on Uniform Security Identification Procedures (CUSIP identifiers): CUSIP comprises 9 characters: 6 character Issuer Code+2 Character Issue+1 Character Checksum. CUSIP numbers are prevalent in business communications of financial institutions. Since SSN are also 9-digit numbers, 9 digit numbers which are valid SSN numbers may be also CUSIP numbers. This ambiguity can cause a high rate of false positives and/or false negatives. Since the 9th digit of CUSIP numbers is a check-sum, simply calculated from the previous 8 characters, for any 8 digit combination, there is a 9th digit that will make it a valid CUSIP. There are therefore 100 Millions valid CUSIP numbers. Assuming a uniform distribution, the overlap between valid SSN and possible CUSIP number is 10%. Since there is a massive traffic of CUSIP, this can cause a lot of false positives. Therefore, in case of such an overlap, an additional "support" may be required—e.g., the string "SSN" or "Social Security Numbers" should appear in the message. However in a case in which there is an SSN that can be a possible CUSIP, but without the term SSN, there is a FALSE NEGATIVE—i.e., 10% false negatives for SSN numbers in a non-delimited form (e.g., '123456789') unless the string SSN appears.

Figure 6A:
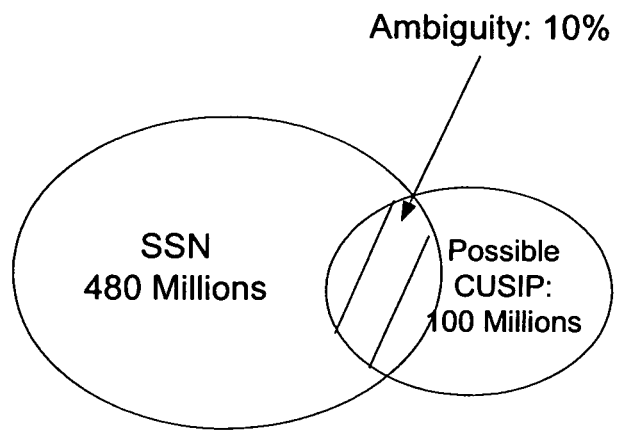
FIGS. 6*a* and 6*b* are Venn diagrams which illustrate the reduction in false positives obtained using a reduced list of CUSIP identifiers, according to a preferred embodiment of the present invention.
Figure 6B:
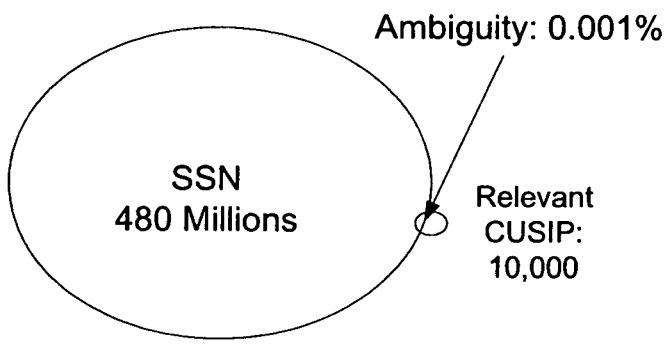

An observation, is that out of the 100 Million possible CUSIP numbers, less then 10,000 are relevant—i.e., issued CUSIP numbers with 9 digits, without alpha characters. Using this explicit list of issued CUSIP numbers, the false negative list may be reduced by a factor of 10,000 (i.e., 0.001% instead of 10% (see FIG. 6*a* and 6*b*)

In a preferred embodiment of the present invention, the list is constantly kept updated, e.g., using email.

In a preferred embodiment of the present invention, the policy comprises at least one of the following actions:
Block the message
Quarantine the message
Encrypt the message
Archive the message
Notify an authorized person about the message
Log the message.

The present embodiments address the shortcomings of the presently known configurations by providing a method and system for allow for an efficient handling of false positive indications of unauthorized dissemination of information in a digital traffic filtering system.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

The invention claimed is:

1. A method for mitigating false positive type errors while applying an information leak prevention policy to identify important information that it is desired to protect and to prevent said important information from leaking outwardly of an organization, the method comprising the computer implemented steps of:

defining at least one positive criterion for a positive set, wherein said positive criterion comprises at least one indicator that a corresponding item contains information the distribution of which may be a possible breach of said information leak prevention policy;

defining at least one negative criterion for a negative set, wherein said negative criterion comprises at least one indicator of benign traffic;

establishing an ambiguity set defined by an intersection between said positive set and said negative set, said intersection containing items showing indications for both said positive set and said negative set, such that information items in said intersection, being all of the information items that belong simultaneously to said positive set and to said negative set, enter said ambiguity set;

defining at least one ambiguity resolution criterion for resolving ambiguity of all members of said ambiguity set, thereby to positively place in or to remove said member from said positive set accordingly;

monitoring and analyzing electronic traffic, where each information item in said traffic is searched for matches with said positive set;

checking each item in said positive set for membership in said ambiguity set;

resolving ambiguities of items in said ambiguity set using one of said ambiguity resolution criterion for each member of the ambiguity set and removing items from the positive set accordingly, said resolving being carried out on the items in all said items in said ambiguity set, being said items which are simultaneously members of said positive set and said negative set; and applying information leak prevention policy for all items remaining in said positive set following said removal of items using ones of said ambiguity resolution criteria, thereby identifying important information that it is desired to protect and to prevent said important information from leaking outwardly of said organization;

the method further comprising entering into said positive set social security numbers and entering into said negative set CUISP identifiers that are numbers valid for the set of social security numbers.

2. A method according to claim 1 wherein said criterion for said positive set is provided by checking for a membership in a pre-defined list.

3. A method according to claim 1 wherein said criterion for said positive set is provided from matching with a regular expression.

4. A method according to claim 1 wherein said criterion for said positive set is provided by measuring a similarity to at least one document.

5. A method according to claim 1, wherein said resolving said ambiguity comprises finding searched for terms predetermined to relate to the positive set, said ambiguity being resolved as positive when the predetermined terms are in proximity to said matches to said positive set, and said ambiguity being resolved as negative otherwise, said proximity being defined by a predetermined threshold.

6. A method according to claim 1, wherein said resolving said ambiguity comprises finding searched for terms predetermined to relate to the negative set, said ambiguity being determined as negative when the predetermined terms are in proximity to said matches to said positive set, said proximity being defined by a predetermined threshold.

7. A method according to claim 1, wherein said resolving said ambiguity comprises applying an additional validation criterion.

8. A method according to claim 1, wherein said information leak prevention policy comprises applying at least one of the following actions:
block the message;
quarantine the message;
encrypt the message;
archive the message;
notify an authorized person about the message, and
log the message.

9. A method according to claim 1 wherein where each item is validated using a validation filter, said validation filter being configured to assert with a predetermined level of certainty that a non-validated finding belongs to a negative set, said validation filter utilizing a condition for validation requiring a match with a regular expression.

10. A method according to claim 1, further comprising
assessing the potential severity of a given possible breach of said information leak prevention policy, to identify certain threats as potentially severe;
for threats identified as potentially severe:
assigning a default positive label, and
performing at least one test to validate said potential high severity cases as negative.

11. Apparatus for mitigating false positive type errors while applying an information leak prevention policy to identify important information that it is desired to protect and to prevent said important information from leaking outwardly of an organization, the apparatus comprising:
a criterion definer for defining at least one positive criterion for a positive set of items, wherein said positive criterion comprises at least one indicator of said important information and a possible breach of said information leak prevention policy, and further for defining at least one negative criterion for a negative set, wherein said negative criterion comprises at least one indicator of benign traffic;
said criterion definer configured to enter into said said positive set social security numbers and to enter into said negative set CUISP identifiers that are numbers valid for the set of social security numbers;
a disambiguator unit for establishing an ambiguity set in association with an intersection between said positive set and said negative set, such that all of said information items containing indicators for both said positive set and said negative set lie in said intersection and enter said ambiguity set, and for defining at least one ambiguity resolution criterion for resolving said ambiguity;
said apparatus being configured to monitor and analyzing electronic traffic, where each information item in said traffic is searched for matches with said positive set; to check each item in said positive set for membership in said ambiguity set; and to resolve ambiguities using one of said ambiguity resolution criterion for each member of the ambiguity set, said ambiguity resolving thus being carried out on all items which are simultaneously in said positive set and said negative set, and removing items from the positive set accordingly, thereby to allow said information leak prevention policy to be applied for all items remaining in said positive set following said removal of items using ones of said ambiguity resolution criteria, thus mitigating false positive type errors while applying an information leak prevention policy to identify important information that it is desired to protect and to prevent said important information from leaking outwardly of said organization.

* * * * *